US008682948B2

(12) United States Patent
Ferguson et al.

(10) Patent No.: US 8,682,948 B2
(45) Date of Patent: Mar. 25, 2014

(54) SCALABLE RANDOM NUMBER GENERATION

(75) Inventors: Niels T. Ferguson, Redmond, WA (US); Dayi Zhou, Redmond, WA (US); Vijay G. Bharadwaj, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 12/986,006

(22) Filed: Jan. 6, 2011

(65) Prior Publication Data

US 2012/0179735 A1 Jul. 12, 2012

(51) Int. Cl.
*G06F 7/58* (2006.01)

(52) U.S. Cl.
USPC .......................................................... 708/254

(58) Field of Classification Search
None
See application file for complete search history.

(56) References Cited

U.S. PATENT DOCUMENTS

| | | | |
|---|---|---|---|
| 6,687,721 B1 | 2/2004 | Wells et al. | |
| 7,930,332 B2* | 4/2011 | Acar et al. | 708/250 |
| 8,189,778 B2* | 5/2012 | Zhang | 380/44 |
| 2005/0129247 A1 | 6/2005 | Gammel et al. | |
| 2008/0022039 A1 | 1/2008 | Luo | |
| 2008/0256151 A1* | 10/2008 | Acar et al. | 708/250 |
| 2008/0263117 A1* | 10/2008 | Rose et al. | 708/254 |
| 2009/0049111 A1* | 2/2009 | Chari et al. | 708/254 |
| 2010/0054466 A1* | 3/2010 | Kerins et al. | 380/46 |
| 2010/0332574 A1* | 12/2010 | Herbert et al. | 708/251 |
| 2012/0179735 A1* | 7/2012 | Ferguson et al. | 708/254 |

OTHER PUBLICATIONS

Bucci, et al., "Fully Digital Random Bit Generators for Cryptographic Applications", Retrieved at <<http://ieeexplore.ieee.org/stamp/stamp.jsp?arnumber=04432925 >>, Circuits and Systems I: Regular Papers, IEEE Transactions, vol. 55, No. 3, Apr. 2008, pp. 861-857.

Jain, et al., "Towards Understanding Algorithmic Factors Affecting Energy Consumption: Switching Complexity, Randomness, and Preliminary Experiments", Retrieved at <<http://www.cs.berkeley.edu/~dmolnar/papers/pomc05.pdf>>, Joint Workshop on Foundations of Mobile Computing, Sep. 2, 2005, pp. 70-79.

Shiga, et al., "An Optimal Entropy Estimator for Discrete Random Variables", Retrieved at <<http://ieeexplore.ieee.org/stamp/stamp.jsp?tp=&arnumber=1556038 >>, Proceedings of International Joint Conferenceon Neural Networks, Jul. 31-Aug. 4, 2005, pp. 6.

Castejon-Amenedo, et al., "Extracting Randomness from External Interrupts", Retrieved at <<http://citeseerx.ist.psu.edu/viewdoc/download?doi=10.1.1.6.1747&rep=rep1&type=pdf >>, Dec. 12, 2003, pp. 6.

(Continued)

*Primary Examiner* — David H Malzahn
(74) *Attorney, Agent, or Firm* — Tony Azure; Andrew Sanders; Micky Minhas

(57) ABSTRACT

In embodiments of scalable random number generation, a system includes one or more entropy pools that combine entropy data, which is derived from entropy sources based on event data. A root pseudo-random number generator (PRNG) maintains a seeded entropy state that is reseeded by the entropy pools, and a seed version identifier updates to indicate a current seed version of the root PRNG. Processor PRNGs are instantiated one each per logical processor in a kernel of the system, where each processor PRNG maintains a PRNG entropy state that is reseeded from the root PRNG, and a processor PRNG generates a random number from a respective PRNG entropy state when invoked.

20 Claims, 4 Drawing Sheets

(56) References Cited

OTHER PUBLICATIONS

"Random(4)—Linux man page", Retrieved at <<http://linux.die.net/man/4/random >>, Retrieved Date: Oct. 8, 2010, pp. 2.

Ellison, Carl., "Cryptographic Random Numbers", Retrieved at <<http://www.std.com/~cme/P1363/ranno.html , Retrieved Date: Oct. 8, 2010, pp. 9.

* cited by examiner

SCALABLE RANDOM NUMBER GENERATION

BACKGROUND

Random number generation is a fundamental process in any computer system. In particular, the security of cryptographic systems depends on having a good source of random numbers. However, computers are highly deterministic in their operation and the output of any algorithm is predictable given the inputs. Accordingly, random numbers are not generated using purely algorithmic means. The generation of random numbers typically consists of two distinct phases, entropy collection and the random number generation. Entropy is information that is not predictable to attackers, and the entropy is used as a seed for a deterministic Pseudo-Random Number Generator (PRNG), which often uses cryptographic techniques. Conventional techniques for entropy collection may try to collect entropy when none is available, when none is needed, or when a device would otherwise remain in a power-conserving, idle state. For small battery-powered devices, energy-efficiency is paramount, and inefficient processor utilization can increase power consumption. Entropy collection when it is not available or needed consumes power and impacts the energy efficiency of a device.

SUMMARY

This summary is provided to introduce simplified concepts of scalable random number generation that are further described below in the Detailed Description. This summary is not intended to identify essential features of the claimed subject matter, nor is it intended for use in determining the scope of the claimed subject matter.

Scalable random number generation is described. In embodiments, a system includes one or more entropy pools that combine entropy data, which is collected from entropy sources based on event data. A root pseudo-random number generator (PRNG) maintains a seeded entropy state that is reseeded by the entropy pools, and a seed version identifier updates to indicate a current seed version of the root PRNG. Processor PRNGs are instantiated one each per logical processor in a kernel of the system, where each processor PRNG maintains a PRNG entropy state that is reseeded from the root PRNG, and a processor PRNG generates a random number from a respective PRNG entropy state when invoked.

In other embodiments, the system also includes application base PRNGs that are instantiated one each per application, and each application base PRNG maintains a base PRNG entropy state that is reseeded on-demand from a processor PRNG. Process PRNGs are instantiated one each per process, per logical processor, and each process PRNG maintains a process PRNG entropy state that is reseeded on-demand from an application base PRNG.

In other embodiments, the one or more entropy pools are dynamically generated on-demand as the entropy data is collected. The seeded entropy state of the root PRNG is reseeded by the one or more entropy pools based on designated time intervals. Each of the processor PRNGs are reseeded from the root PRNG on-demand when a processor PRNG is invoked to generate a random number. Each of the processor PRNGs also maintain a seed version that indicates a reseed version of a PRNG entropy state in a respective processor PRNG. The seed version identifier at the root PRNG is global in the system and configured for access by the processor PRNGs, the application base PRNGs, and the process PRNGs. The seed version of a PRNG can be compared to the seed version identifier at the root PRNG to determine whether to reseed the PRNG entropy state of the PRNG.

BRIEF DESCRIPTION OF THE DRAWINGS

Embodiments of scalable random number generation are described with reference to the following drawings. The same numbers are used throughout the drawings to reference like features and components.

DETAILED DESCRIPTION

Scalable random number generation is described. In embodiments, a system includes one or more entropy pools that combine entropy data, which is derived from entropy sources, some of which may be based on event data such as interrupt timing. A root pseudo-random number generator (PRNG) maintains a seeded entropy state that is reseeded by the entropy pools, and a seed version identifier, such as a counter, a number, or a different type of identifier, that indicates a current seed version of the root PRNG. For example, a seed version counter can be incremented to indicate a current seed version of the root PRNG. Processor PRNGs are instantiated one each per logical processor in a kernel of the system, where each processor PRNG maintains a PRNG entropy state that is reseeded from the root PRNG. The system also includes application base PRNGs that are instantiated one each per application, and each application base PRNG maintains a base PRNG entropy state that is reseeded on-demand from a processor PRNG. Process PRNGs are instantiated one each per process, per logical processor, and each process PRNG maintains a process PRNG entropy state that is reseeded on-demand from an application base PRNG.

Each of the PRNGs in the system generates random numbers from it's own internal PRNG entropy state. Entropy generation is driven by interrupt events, and does not cause background activity when the system is idle, which conserves energy. Additionally, the entropy gathering process does not affect the execution time of PRNG invocations, and can therefore be as slow as necessary without affecting PRNG performance.

While features and concepts of the described systems and methods for scalable random number generation can be implemented in any number of different environments, systems, devices, and/or various configurations, embodiments of scalable random number generation are described in the context of the following example devices, systems, and configurations.

Figure 1:
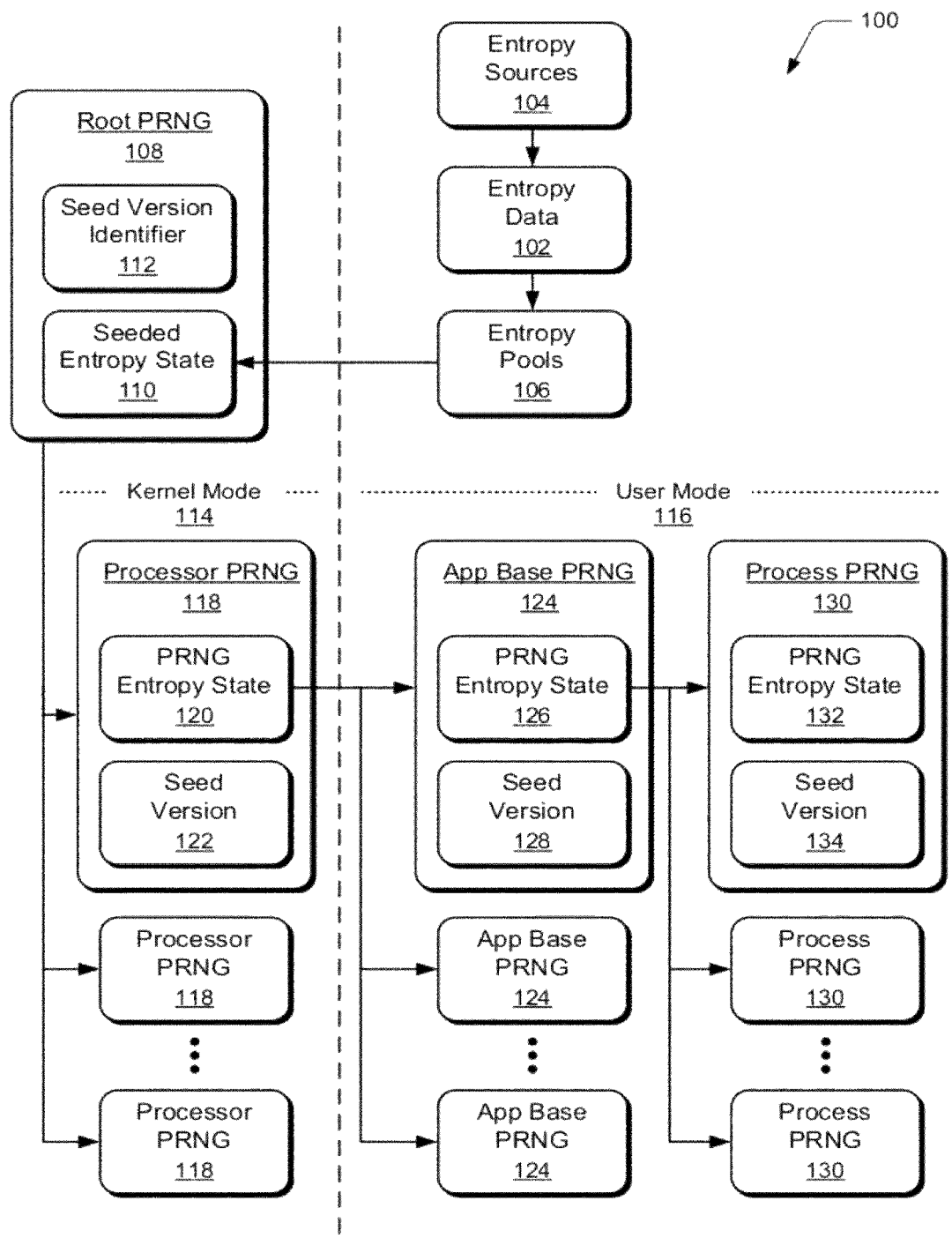
FIG. 1 illustrates an example system in which embodiments of scalable random number generation can be implemented.

FIG. 1 illustrates an example system 100 in which various embodiments of scalable random number generation can be implemented. The example system 100 illustrates entropy collection and random number generation. Entropy data 102 is collected from entropy sources 104. The entropy data can be derived from the timing of interrupts associated with network activity. The entropy data can also be derived from device inputs, such as a mouse or keyboard input. An interrupt can include a time-stamp that is associated with a hardware interrupt. For example, interrupt data may include time-stamps associated with a device input, other types of user input, completion of a disk I/O, or network activity. Entropy sources can also include hardware sources which are implemented for the specific purpose of generating random bits. In addition to interrupt timing, the entropy data can also be derived from state data, such as from application processing, registry entries, internal device processes, details of mouse movements, etc.

The entropy data 102 is intended to be unpredictable, referred to as the uncertainty that the entropy data has when combined from the different entropy sources. The entropy data is collected in one or more entropy pools 106, which begins as a single entropy pool into which the incoming entropy data is added. In implementations, the entropy data is combined or mixed in the entropy pool utilizing an on-going partial hash computation and/or other cryptographic techniques and algorithms. In implementations, an entropy pool stores a fixed amount of data that summarizes the usable entropy in a collection of entropy data. For example, an entropy pool contains thirty-two (32) bytes, which can be obtained when processing kilobytes or even megabytes of timing and state information.

Entropy can be added to the entropy pool through a one-way function that combines a current entropy pool value and new entropy data to generate a new or updated entropy pool value. Alternatively, entropy can be added to the entropy pool using a different (not a one-way) function. The entropy pool has a capacity limit, in that the thirty-two (32) bytes does not contain more than thirty-two (32) bytes of randomness. However, this is not a hard limit because entropy data can still be added to the entropy pool after the entropy pool is considered full, where full indicates a reason to believe that all of the bits in the entropy pool are independent and uniformly random.

The entropy pools combine the entropy data into a fixed state, which retains the entropy uncertainty up to the limit imposed by the size of the state. In embodiments, the entropy pools can be implemented as objects that are instantiated as data structures to maintain the entropy data, and with functions to combine the entropy data in an entropy pool. Additional entropy pools 106 can be dynamically generated as the entropy data 102 is collected. In an embodiment, the system may start with just one entropy pool and additional entropy pools are created as more entropy data is collected. The number of entropy pools in a scalable random number generation system can be fixed or variable.

The example system 100 includes a root pseudo-random number generator (PRNG) 108 (also referred to in implementations as a deterministic random bit generator (DRBG)). In embodiments, the PRNGs described herein are also implemented as objects that are instantiated as data structures to maintain an entropy state for random number generation. The root PRNG 108 maintains a seeded entropy state 110, which is reseeded from the entropy pool 106 when the entropy pool has collected enough entropy data from entropy sources and/or after a designated time duration. In embodiments, the seeded entropy state of the root PRNG is reseeded on a time schedule, which limits the overhead of reseeding the entire hierarchy of PRNGs in a system. The root PRNG also includes a seed version identifier 112, which is updated each time the root PRNG is reseeded and indicates the current seed version. The seed version identifier is global in the system and made available in the process space of every process by the operating system to provide that other PRNGs in the system can check the seed version of the seeded entropy state.

The example system 100 illustrates a system implementation that has a kernel mode 114 and a user mode 116 (e.g., applications that are executed by one or more processors in a system, or on a device). The root PRNG is a first-layer of a scalable random number generation system, and is included in the kernel mode. A second layer of PRNGs in the scalable random number generation system (also in the kernel mode) includes processor PRNGs 118, one each per logical processor in the kernel. Each processor PRNG can be instantiated the first time that a processor PRNG is invoked on a particular logical processor, and the number of processor PRNGs scales automatically with the number of logical processors in the system. Each processor PRNG maintains a PRNG entropy state 120 when the processor PRNGs are seeded from the root PRNG 108. Each of the processor PRNGs also include a seed version 122 that indicates a reseed version when a particular processor PRNG is reseeded. Every time that a second-layer, processor PRNG is called, the stored seed version can be checked against the seed version identifier 112, and if the stored seed version does not match the seed version identifier, then the processor PRNG reseeds itself from the root PRNG. Note that calls to a processor PRNG on a particular logical processor will invoke the second-layer processor PRNG for that particular logical processor.

A third-layer of PRNGs in the scalable random number generation system (in the user mode) includes application base PRNGs 124, one each per application. Each application base PRNG can be instantiated the first time that an application is executed. Each application base PRNG maintains a PRNG entropy state 126 when the application base PRNGs are seeded from a second-layer, processor PRNG 118. Each of the application base PRNGs also include a seed version 128 that indicates when a particular application base PRNG is reseeded. Every time that a third-layer, application base PRNG is invoked, the stored seed version can be checked against the seed version identifier 112, and if the stored seed version does not match the seed version identifier, then the application base PRNG 124 reseeds itself from a second-layer, processor PRNG 118.

A fourth-layer of PRNGs in the scalable random number generation system (in the user mode) includes process PRNGs 130, one each per process, per logical processor. Each process PRNG can be instantiated the first time that a process PRNG is invoked in a process running on a logical processor. Each process PRNG maintains a PRNG entropy state 132 when the process PRNGs are seeded from the third-layer, application base PRNG 124 that corresponds to the process. Each of the process PRNGs also include a seed version 134 that indicates when a particular process PRNG is reseeded. Every time that a fourth-layer, process PRNG is invoked, the stored seed version is checked against the seed version identifier 112, and if the stored seed version does not match the seed version identifier, then the process PRNG 130 reseeds itself from the corresponding third-layer, application base PRNG 124.

Although the example system 100 is described with four layers of PRNGs, a scalable random number generation system can be implemented with any number of PRNG layers. A PRNG hierarchy may include one or more levels of PRNGs (to include a single PRNG). Additionally, per-processor PRNGs can be instantiated anywhere in the system, such as in the kernel layer of the system and/or in the application layer (e.g., user mode) of the system, and may also be implemented without a root PRNG. The PRNGs can be created at any time, either during system startup, such as the one root PRNG 108 in the kernel, or on-demand, such as the processor PRNGs 118 created one each per logical processor in the kernel, the application base PRNGs 124 created one each as a base state per executed application, and the process PRNGs 130 created one each per process per logical processor. Each of the PRNGs in the system generates random numbers from it's own internal PRNG entropy state, and the PRNGs are reseeded on-demand.

When processes are idle, the overhead and power consumption to generate random numbers is minimized. After the root PRNG 108 reseeds and the seed version identifier 112 is updated, all of the PRNGs in the system will reseed if necessary before producing data (e.g., a random number). However, each PRNG is reseeded on-demand. For example, when an application is idle for a period of time and then requests generation of a random number, the request is directed to the corresponding process PRNG 130. If the PRNG entropy state 132 is not the latest version based on the seed version 134 when compared to the seed version identifier 112, which is likely due to the application being idle, a request is directed to an application base PRNG 124 to reseed the PRNG entropy state 132 of the process PRNG 130. Similarly, if the PRNG entropy state 126 at the application base PRNG 124 is not the latest version based on the seed version 128 when compared to the seed version identifier 112, a request is directed to a processor PRNG 118 to reseed the PRNG entropy state 126 of the application base PRNG 124. Similarly, if the PRNG entropy state 120 at the processor PRNG 118 is not the latest version based on the seed version 122 when compared to the seed version identifier 112, a request is directed to the root PRNG 108 to reseed the PRNG entropy state 120 of the processor PRNG 118.

In embodiments, the PRNGs described herein are implemented as objects that are instantiated as data structures that each maintain an entropy state for random number generation. A PRNG can be implemented to include an entropy state, an output function, a state transition function, and a reseed function. When a PRNG is invoked (e.g., a random number is requested), the PRNG calls the output function that returns a one-way function of the current entropy state (so the output is not used to compute the current entropy state). After generating the output, the PRNG executes the state transition function to update the entropy state value with a different one-way function of the current entropy state (so the output is not used to compute the present or future entropy states, and the current entropy state is not used to compute previous states or outputs). When a reseed is requested along with the input of new entropy, the PRNG transitions its state to a one-way function of the current state and the new entropy so that the new entropy state is not computed from just the new entropy or just the old state, and the new entropy state is not used to compute either the new entropy or the old entropy state.

Figure 2:
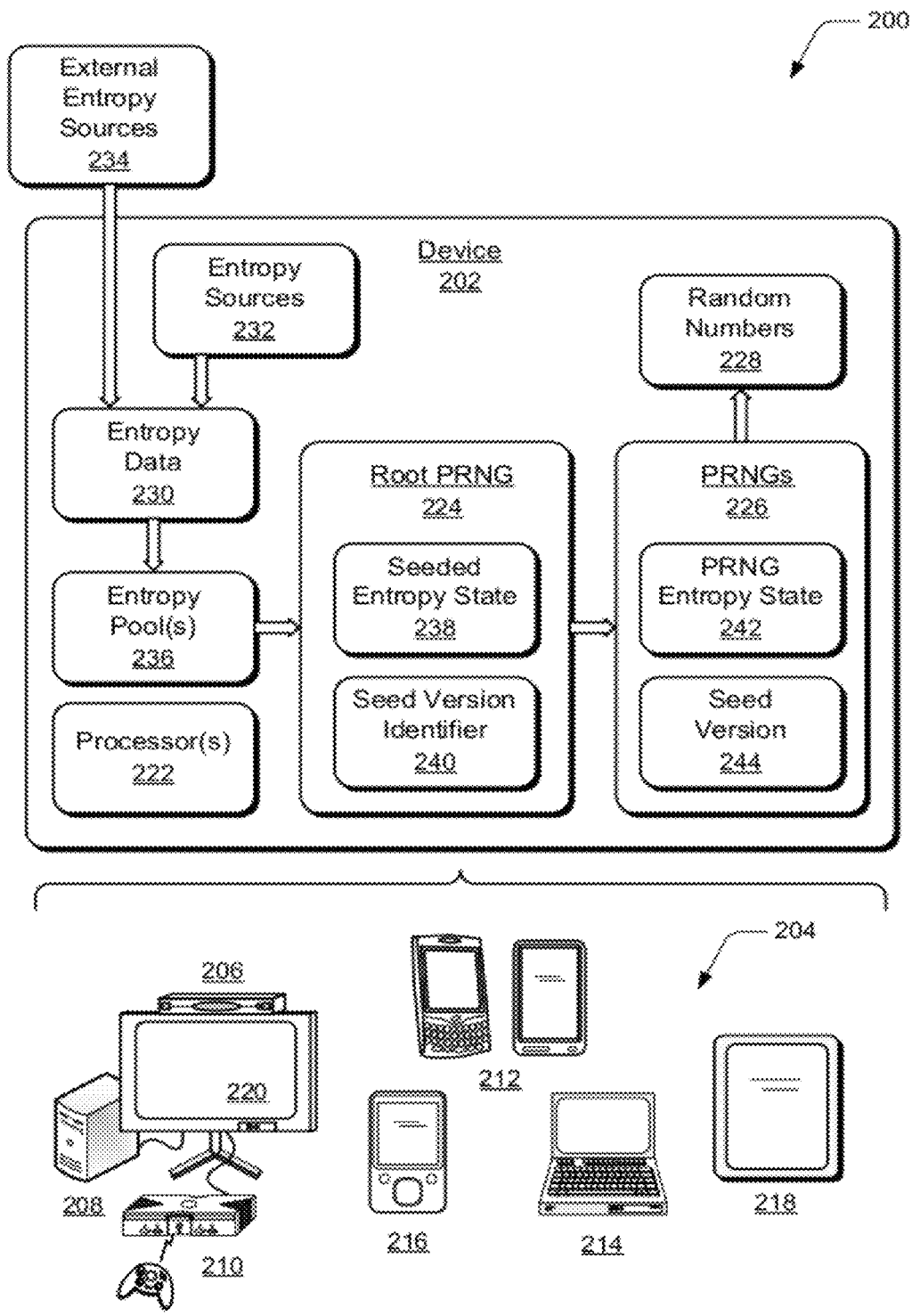
FIG. 2 illustrates another example system in which embodiments of scalable random number generation can be implemented.

FIG. 2 illustrates an example system 200 in which various embodiments of scalable random number generation can be implemented. The example system 200 includes a device 202, which may be configured as any type of computing device 204. Any of the various computing devices 204 can be configured as the device 202, and may be implemented with any number and combination of differing components as further described with reference to the example device shown in FIG. 4.

A device can be implemented as any one or combination of a television client device 206, a computer device 208, a gaming system 210, an appliance device, an electronic device, and/or as any other type of device. The various devices can also include wireless devices implemented to receive and/or communicate wireless data, such as any one or combination of a mobile phone 212 (e.g., cellular, VoIP, WiFi, etc.), a portable computer device 214, a media player device 216, a tablet device 218, and/or any other wireless device. A client system can include a respective device and a display device 220.

The device 202 can include one or more processors 222 (e.g., any of microprocessors, controllers, and the like) which process various computer-executable instructions to control the operation of the computing device. The device also includes memory that may be implemented using one or more memory devices (e.g., computer-readable storage media) that enable data storage. A memory device can be implemented as any type of memory, storage media, and/or suitable electronic data storage. The memory provides data storage for various applications that can be executed by the processors. For example, the device can include a random number generator that is an algorithm, which is instantiated and executed in different contexts, such as a root PRNG 224 and PRNGs 226. The random number generator stores a number of PRNG entropy states 220 throughout the system, including per-processor, per-application, and per-process. When a random number is requested, the random number generator selects an entropy state based on factors such as CPU and process affinity, updates the entropy state if needed, and generates a random number 228 by performing a PRNG operation on the state.

As described above with reference to FIG. 1 for entropy collection, entropy data 230 can be derived form entropy sources 232 and/or external entropy sources 234. The entropy data is collected in one or more entropy pools 236 where the entropy data is combined into a fixed-size state, and used to seed the root PRNG 224 according to designated time intervals, or based on a time schedule. Alternatively or in addition, the root PRNG can be reseeded based on an amount of entropy collected in the one or more entropy pools. The root PRNG maintains the seeded entropy state 238, which is reseeded from the one or more entropy pools. The root PRNG also includes a seed version identifier 240, which is updated each time the root PRNG is reseeded.

The device 202 also includes the various PRNGs 226, such as processor PRNGs, one each per logical processor in the kernel; application base PRNGs, one each per application; and process PRNGs, one each per process, per logical processor. Although this example is described with four layers of PRNGs, the device can implement a scalable random number generation system with any number of PRNG layers. Each PRNG 226 maintains a PRNG entropy state 242, and a seed version 244 that indicates when the PRNG entropy state of a particular PRNG is reseeded.

When an application requests a random number, the application determines whether the per-application, per-CPU PRNG entropy state needs to be reseeded, such as by comparing the seed version 244 of the PRNG entropy state 242 to the seed version identifier 240. If the PRNG entropy state is the latest reseed version, the application uses the PRNG entropy state to generate the random number. However, if the PRNG entropy state is not the latest reseed version, the application requests the random number from the per-application base PRNG, reseeds from the per-application base PRNG, and then generates the random number.

If the random number is requested from the per-application base PRNG, then the application determines whether the per-application base PRNG entropy state needs to be reseeded. If the PRNG entropy state is the latest reseed version, the application uses the PRNG entropy state to generate the random number. However, if the PRNG entropy state is not the latest reseed version, the application requests the random number from the per-processor (CPU kernel) PRNG, reseeds from the per-processor PRNG, and then generates the random number.

If the random number is requested from the per-processor PRNG, then the operating system kernel determines whether the per-processor PRNG entropy state needs to be reseeded. If the PRNG entropy state is the latest reseed version, the random number is generated from the current PRNG entropy state. However, if the PRNG entropy state is not the latest reseed version, the random number is requested from the root PRNG 224, the per-processor PRNG is reseeded, and the random number generated.

If the random number is requested from the root PRNG 224, then the operating system kernel determines whether the seeded entropy state 238 of the root PRNG needs to be reseeded. If not, the seeded entropy state is used to generate the random number. However, if the seeded entropy state does need to be reseeded, then the seeded entropy state is reseeded from the one or more entropy pools 236, and the random number is generated.

Example method 300 is described with reference to FIG. 3 in accordance with one or more embodiments of scalable random number generation. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
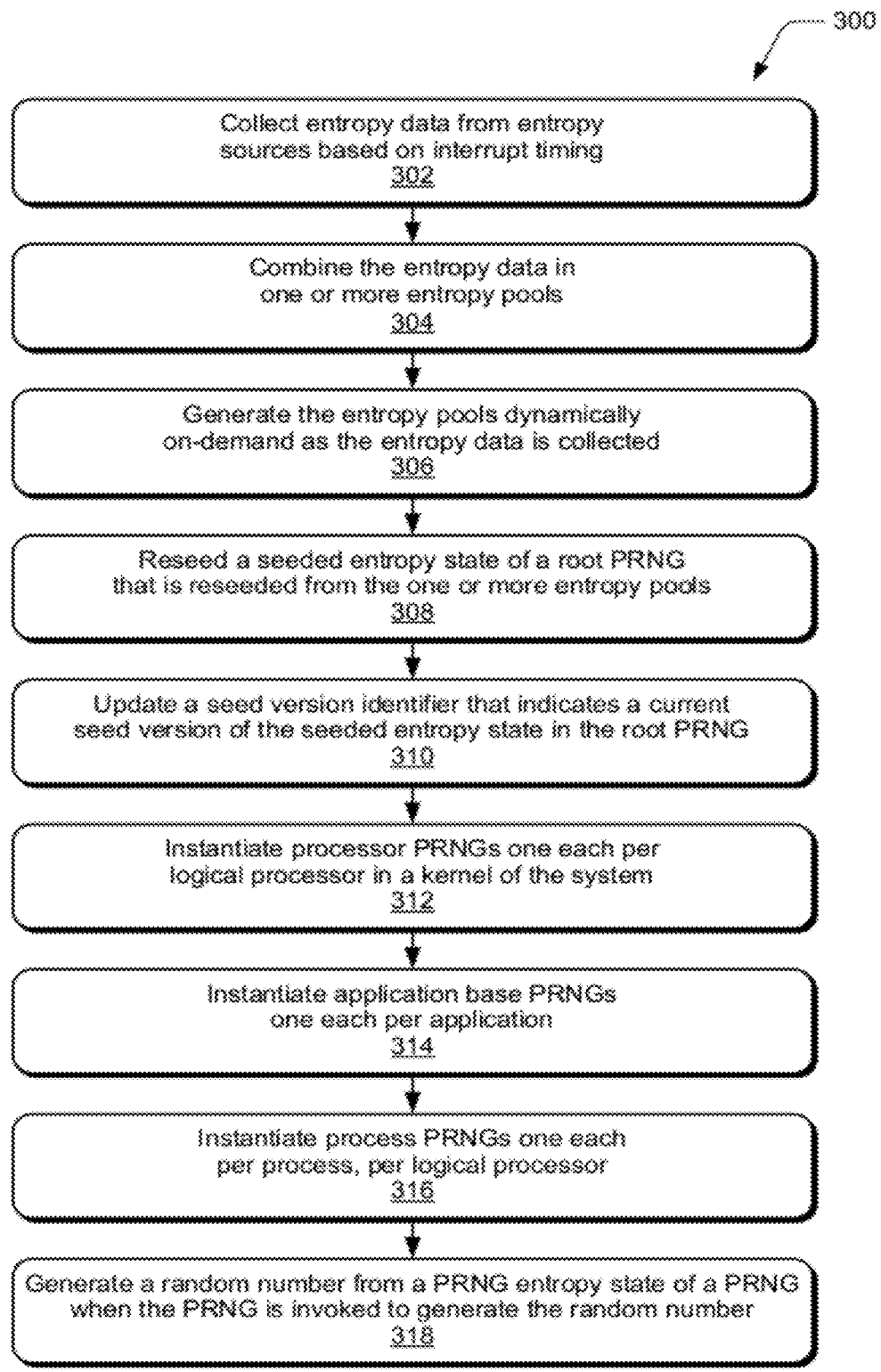
FIG. 3 illustrates example method(s) of scalable random number generation in accordance with one or more embodiments.

FIG. 3 illustrates example method(s) 300 of scalable random number generation. The order in which the method blocks are described is not intended to be construed as a limitation, and any number of the described method blocks can be combined in any order to implement a method, or an alternate method.

At block 302, entropy data is collected from entropy sources based on interrupt timing and, at block 304, the entropy data is combined in one or more entropy pools. For example, the entropy data 102 (FIG. 1) is collected from the entropy sources 104, and then collected in the entropy pools 106. At block 306, the entropy pools are generated dynamically on-demand as the entropy data is collected. For example, additional entropy pools 106 are dynamically generated as the entropy data 102 is collected, and the number of entropy pools in a scalable random number generation system can be fixed or variable.

At block 308, a seeded entropy state of a root PRNG that is reseeded from the one or more entropy pools is reseeded. For example, the root PRNG 108 maintains a seeded entropy state 110, which is reseeded from the entropy pool 106 when the entropy pool has collected enough entropy data from interrupt timings and/or after a designated time duration. In embodiments, the seeded entropy state of the root PRNG is reseeded from the one or more entropy pools based on designated time intervals.

At block 310, a seed version identifier is updated to indicate a current seed version of the seeded entropy state in the root PRNG. For example, the root PRNG 108 includes a seed version identifier 112, which is updated each time the root PRNG is reseeded and indicates the current seed version. The seed version identifier is global in the system and made available in the process space of every process by the operating system to provide that other PRNGs in the system can check the seed version of the seeded entropy state.

At block 312, processor PRNGs are instantiated one each per logical processor in a kernel of the system. For example, processor PRNGs 118 are instantiated one each per logical processor in the kernel, and each processor PRNG maintains a PRNG entropy state 120 that is reseeded on-demand from the root PRNG. At block 314, application base PRNGs are instantiated one each per application. For example, application base PRNGs 124 are instantiated one each per application, and each application base PRNG maintains a base PRNG entropy state 126 that is reseeded on-demand from a processor PRNG.

At block 316, process PRNGs are instantiated one each per process, per logical processor. For example, process PRNGs 130 are instantiated one each per process, per logical processor, and each process PRNG maintains a process PRNG entropy state 132 that is reseeded on-demand from an application base PRNG. At block 318, a random number is generated from a PRNG entropy state of a PRNG when the PRNG is invoked to generate the random number. For example, any of the described PRNGs generate a random number 228 from a respective PRNG entropy state when the PRNG is invoked to generate the random number.

Figure 4:
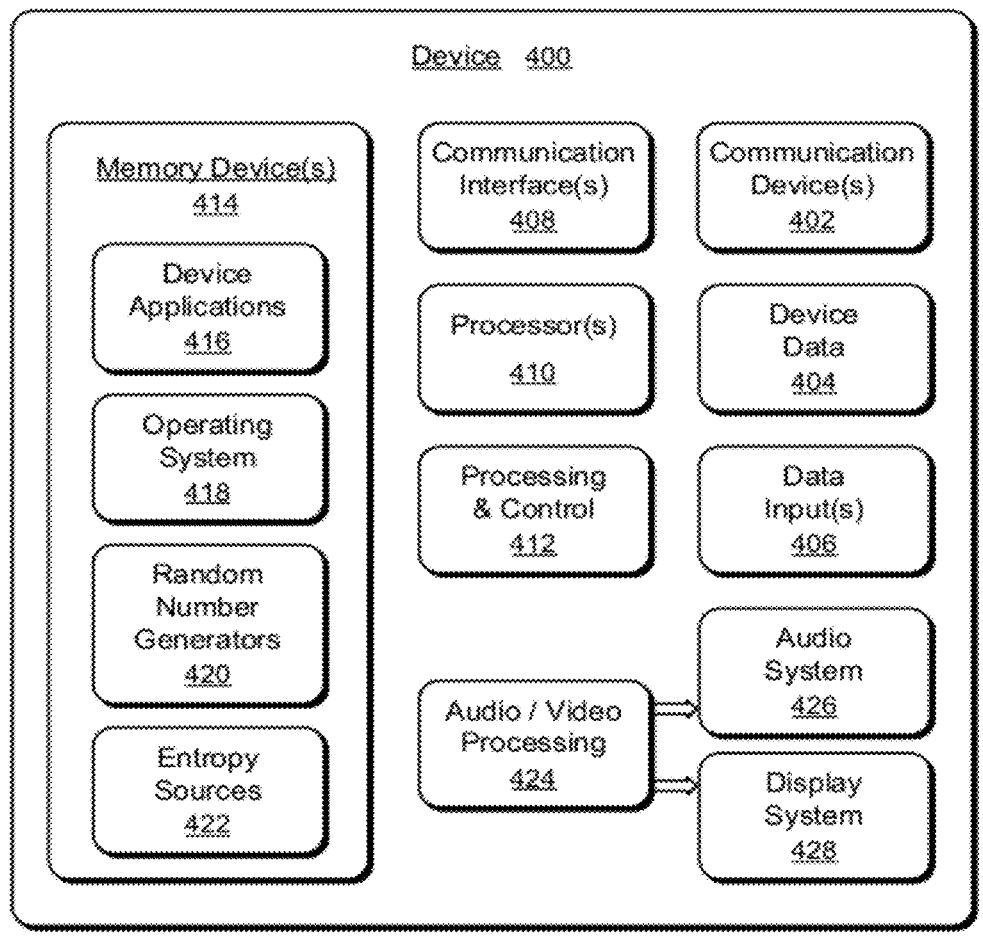
FIG. 4 illustrates various components of an example device that can implement embodiments of scalable random number generation.

FIG. 4 illustrates various components of an example device 400 that can be implemented as any of the devices, or services implemented by devices, described with reference to the previous FIGS. 1-3. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 406 via which any type of data, media content, and/or inputs can be received, such as user-selectable inputs, messages, communications, music, television content, recorded video content, and any other type of audio, video, and/or image data received from any content and/or data source.

The device 400 also includes communication interfaces 408, such as any one or more of a serial, parallel, network, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices (e.g., computer-readable storage media) 414 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 414 provides data storage mechanisms to store the device data 404, other types of information and/or data, and various device applications 416. For example, an operating system 418 can be maintained as a software application with a memory device and executed on the processors. The device applications may also include a device manager, such as any form of a control application, software application, signal processing and control module, code that is native to a particular device, a hardware abstraction layer for a particular device, and so on.

In this example, the device applications 416 also include random number generators 420. In addition, various device applications may be implemented as entropy sources 422 that contribute interrupt data and/or state data from which buffered entropy may be derived. The random number generators and the entropy sources are shown as software modules and/or computer applications. Alternatively or in addition, the random number generators and/or the entropy sources can be implemented as hardware, software, firmware, fixed logic, or any combination thereof.

The device 400 also includes an audio and/or video processing system 424 that generates audio data for an audio system 426 and/or generates display data for a display system 428. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of scalable random number generation have been described in language specific to features and/or methods, the subject of the appended claims is not necessarily limited to the specific features or methods described. Rather, the specific features and methods are disclosed as example implementations of scalable random number generation.

The invention claimed is:

1. A system, comprising:
   entropy data collected from one or more entropy sources based on event data;
   one or more entropy pools configured to collect the entropy data, the one or more entropy pools dynamically generated on-demand as the entropy data is collected; and
   processor pseudo-random number generators (PRNGs) implemented one each per logical processor of the system, each processor PRNG configured to maintain a PRNG entropy state that is reseeded with the entropy data, the processor PRNGs reseeded according to a PRNG hierarchy that comprises one or more levels of the processor PRNGs, and a processor PRNG further configured to generate a random number from a respective PRNG entropy state.

2. A system as recited in claim 1, wherein the PRNG entropy state of each processor PRNG is reseeded according to the PRNG hierarchy.

3. A system as recited in claim 2, further comprising a seed version identifier configured to update and indicate a current seed version of the PRNG entropy states, and wherein the PRNG entropy states are reseeded on-demand when a processor PRNG is invoked to generate the random number.

4. A system as recited in claim 2, further comprising:
   a root PRNG in the PRNG hierarchy, the root PRNG configured to maintain a seeded entropy state that is reseeded from the one or more entropy pools.

5. A system as recited in claim 4, wherein the seeded entropy state of the root PRNG is configured to be reseeded from the one or more entropy pools based on a designated time schedule.

6. A system as recited in claim 1, wherein the processor PRNGs are implemented in at least one of a kernel layer of the system or an application layer of the system.

7. A system as recited in claim 1, wherein each of the processor PRNGs are further configured to maintain a seed version that indicates a reseed version of a PRNG entropy state in a respective processor PRNG.

8. A system as recited in claim 7, wherein the seed version of a processor PRNG is compared to a seed version identifier of a root PRNG to determine whether to reseed the PRNG entropy state of the processor PRNG.

9. A system, comprising:
one or more entropy pools configured to collect entropy data that is derived from one or more entropy sources based on event data, the one or more entropy pools dynamically generated on-demand as the entropy data is collected; and
pseudo-random number generators (PRNGs) each configured to maintain a PRNG entropy state that is reseeded from the one or more entropy pools, the PRNGs reseeded according to a PRNG hierarchy, and a PRNG further configured to generate a random number from a respective PRNG entropy state.

10. A system as recited in claim 9, wherein the PRNGs are configured in a PRNG hierarchy that comprises one or more levels of the PRNGs.

11. A system as recited in claim 10, further comprising a seed version identifier configured to update and indicate a current seed version of the PRNG entropy states, and wherein the PRNG entropy states are reseeded on-demand when needed.

12. A system as recited in claim 10, further comprising a root PRNG in the PRNG hierarchy, the root PRNG configured to maintain a seeded entropy state that is reseeded from the one or more entropy pools based on a designated time schedule.

13. A system as recited in claim 12, wherein the PRNGs comprise:
processor PRNGs implemented one each per logical processor of the system, each processor PRNG configured to maintain a PRNG entropy state that is reseeded on-demand from the root PRNG;
application base PRNGs implemented one each per application, each application base PRNG configured to maintain a base PRNG entropy state that is reseeded on-demand from a processor PRNG; and
process PRNGs implemented one each per process, per logical processor; each process PRNG configured to maintain a process PRNG entropy state that is reseeded on-demand from an application base PRNG.

14. A system as recited in claim 9, wherein each of the PRNGs are further configured to maintain a seed version that indicates a reseed version of a PRNG entropy state in a respective PRNG.

15. A method, comprising:
collecting entropy data from one or more entropy sources based on event data;
combining the entropy data in one or more entropy pools;
reseeding a seeded entropy state of a root pseudo-random number generator (PRNG) that is reseeded from the one or more entropy pools;
implementing processor PRNGs one each per logical processor in a kernel of the system, each processor PRNG maintaining a PRNG entropy state that is reseeded from the root PRNG, the processor PRNGs reseeded according to a PRNG hierarchy; and
generating a random number from a PRNG entropy state of a processor PRNG when the processor PRNG is invoked to generate the random number.

16. A method as recited in claim 15, further comprising implementing application base PRNGs one each per application, each application base PRNG maintaining a base PRNG entropy state that is reseeded on-demand from a processor PRNG.

17. A method as recited in claim 16, further comprising implementing process PRNGs one each per process, per logical processor, each process PRNG maintaining a process PRNG entropy state that is reseeded on-demand from an application base PRNG.

18. A method as recited in claim 15, further comprising generating the one or more entropy pools dynamically on-demand as the entropy data is collected.

19. A method as recited in claim 15, further comprising updating a seed version identifier that indicates a current seed version of the seeded entropy state in the root PRNG.

20. A method as recited in claim 15, wherein the seeded entropy state of the root PRNG is reseeded from the one or more entropy pools based on designated time intervals.

* * * * *